Oct. 21, 1952  H. F. HEIDEGGER ET AL  2,614,872
SPROCKET FASTENING MEANS
Filed March 8, 1949
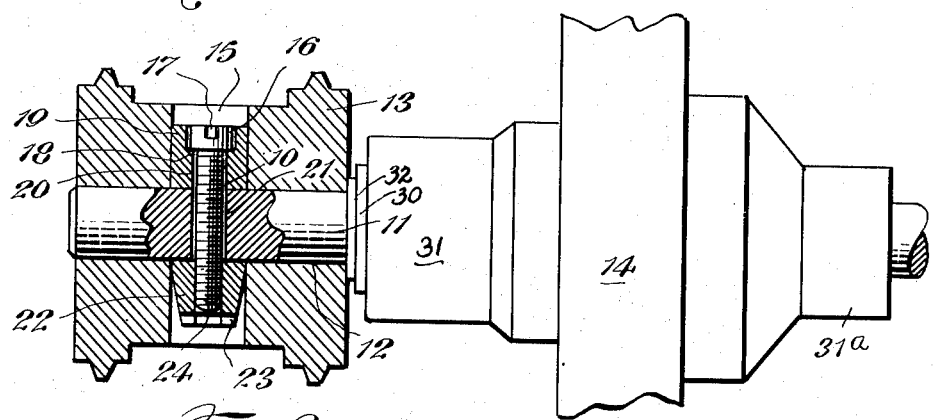
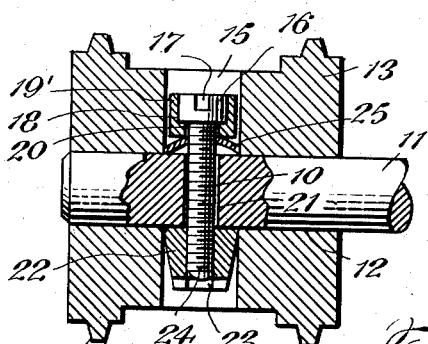
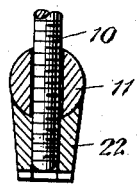
INVENTORS
Henry F. Heidegger
Willy Borberg
BY
James B Boyer
ATTORNEY Patented Oct. 21, 1952

2,614,872

UNITED STATES PATENT OFFICE 2,614,872

SPROCKET FASTENING MEANS

Henry F. Heidegger, Glen Ridge, N. J., and Willy Borberg, Astoria, N. Y., assignors to International Projector Corporation, Bloomfield, N. J., a corporation of Delaware Application March 8, 1949, Serial No. 80,226

8 Claims. (Cl. 287—52.08)

This invention relates to improvements in sprocket fastening means, and is more particularly directed to a novel means to removably attach a rotatable driving element, such as a film feeding sprocket, pulley, gear or other rotatable element, to its shaft.

Though the invention is capable of use in mounting a great variety of sprockets, pulleys, hubbed gears or similar elements to rotary shafts, it is especially applicable for use in mounting film-engaging sprockets on projector shafts. In motion picture projecting machines, it is highly important that the continuous film be led to the projection aperture and drawn from in front of such aperture smoothly, evenly and swiftly and without undulations or lateral play. To attain these ends, the film web travels from the upper reel over or under successive, continuously running and intermittently rotating toothed sprockets the teeth of which enter sprocket holes formed in the margin of the film web. The film is held engaged with the teeth by suitably supported grooved guide or pad rollers embracing the circular series of teeth formed on the enlarged rims or flanges of the sprockets. A clearance is allowed between the pad rollers and the peripheries of the end flanges of the toothed sprockets to avoid pinching the film.

To increase the rate of manufacture of the sprockets used in motion picture projecting machines, resort is often made to forming the axially extending bores of the sprockets by broaching and reaming. Any bore that is broached becomes slightly barrel-shaped because such operation pushes the metal aside or compacts the metal instead of cleanly removing it, as is the case when drill bored. Also, after the broaching pressure is removed and the operation is completed, the metal tends slightly to return to its former position. Barrel-shaped bores after broaching and reaming are not readily detected by the usual guages since the opposite ends of the bores are generally of the correct diameter. When such a sprocket is mounted on a rotatable shaft, it tends to have an elliptical orbit or to wobble when securely fastened to the shaft by set screws or other means. When used in connection with the usual guide and film-retaining pad rollers, pinching of the film between the pad or guide rollers and such a sprocket may result with a consequent liability of tearing or otherwise damaging the film. Such film damage is most apt to occur with patched films.

Other objections are inherent in the usual methods heretofore used to rigidly secure the film sprockets to their shafts. For instance, it has been customary to attach the sprocket wheels to their shafts by ordinary set screws threaded into holes extending radially through the sprocket barrels from the peripheries thereof into the bores and with the inner ends of the set screws bearing firmly against the shafts.

One great objection to the customary method of attaching the sprocket wheels to their shafts by ordinary set screws is that when the retaining set screw is turned down tightly on the shaft, it tends to bend the shaft when the bores of the sprockets are barrel-shaped or otherwise out of true alignment. Also, as the bores of the sprockets even when accurate are slightly larger in diameter than the diameter of the shafts, this method of fastening takes up all the clearance on one side of the sprocket bore and doubles the clearance on the diametrically opposite side of the sprocket bore, resulting in eccentrically positioning the sprocket on the shaft. Similar results occur if a reverse arrangement of rigidly securing the sprockets to their shafts is resorted to, wherein the radial hole in the sprocket is unthreaded, but is shouldered or counter-bored, and a threaded hole formed radially in the shaft. In this form, radial holes in the sprocket and shaft are aligned and a headed set screw entered in the unthreaded, counter-bored radial sprocket hole and screwed into the threaded hole in the shaft. When the set screw is tightened with its head against the counter-bored shoulder in the radial sprocket hole, the shaft is drawn towards the screw instead of being forced away, as in the first example, but the eccentric positioning of the sprocket on the shaft occurs just as above explained because the clearance is taken up between the sprocket bore and the shaft.

Another objection present in the set screw method of securing pulleys, sprockets and the like fixedly to shafts is that when setting the screw fast on the shaft, the force required to firmly engage the screw with the shaft not only causes the end of the screw to indent the shaft, but as the screw is given the last turn or turns, the end of the screw raises a bur on the shaft which forms an obstruction preventing the attached sprocket or the like from being readily slid on or off of the shaft.

One principal object of the present invention is to provide means to attach a sprocket, pulley, gear or similar element to a shaft by novel means which avoids the foregoing disadvantages while retaining the advantages of easy application and removal of the sprocket.

It is thus an object of the present invention to provide means to secure the sprocket or analogous part on its shaft against relative rotation and in such manner as to avoid not only any likelihood of eccentrically shifting the sprocket, but also to avoid any danger of bending the shaft or the misalignment of the sprocket thereon as heretofore encountered. The invention further contemplates mounting the sprocket somewhat loosely on its shaft instead of fastening it tightly thereto, and the provision of means which not only serves as a key to transmit rotary motion to the sprocket but also retains the sprocket on the shaft and aligned in proper balance therewith.

Other objects and advantages will be more fully set forth hereinafter and particularly pointed out in the claims.

In the accompanying drawings,

Fig. 1 is a view partly in section of the sprocket and shaft embodying the invention together with a fragmentary portion of the projector frame;

Fig. 2 is a vertical view partly in section of a modification of the form shown in Fig. 1;

Fig. 3 is a detail view of a fastening nut having a concave contact face, as used in the present invention.

The present invention eliminates the foregoing and other disadvantages by avoiding the necessity for firmly clamping the sprocket frictionally or otherwise to the shaft, and instead of fixedly securing the sprocket and shaft together as a substantially integral unit, the sprocket is mounted on the shaft without distortion of the shaft, to enable the sprocket to automatically maintain its concentricity with the shaft.

To these and other ends, in that form of the invention shown in Figs. 1 and 2, the shaft 11, driven from any suitable source of power, not shown, is revolubly mounted in a bearing or bushing 30 supported in hollow bosses 31, 31a projecting in opposite directions from the opposed faces of a sub-frame 14 of a motion picture projecting machine. A feed sprocket 13, having an axial bore 12 is mounted on the drive shaft 11.

It is highly important in motion picture projecting machines, that the sprocket-wheels be correctly positioned on their shafts to maintain a proper alignment of the film as it is fed from one sprocket to another at an approximate rate of ninety feet per minute in commercial machines during projection.

As a novel means to attach the sprocket to the shaft in such manner as to prevent material longitudinal movement of the sprocket on its shaft, an unthreaded hole or passage 15 is drilled diametrically through the barrel of the sprocket 13, such hole intersecting the bore 12 of the sprocket at right angles. The shaft 11 is also provided with an unthreaded hole or locking shaft bore 21 drilled diametrically therethrough and of less diameter than the diametrical passage 15 formed through the sprocket.

The sprocket 12 is slid onto the free end of the shaft 11, and the passage 15 of the sprocket is aligned with the locking shaft bore 21 in the shaft, after which a cylindrical thimble or collar 19 of an outside diameter substantially fitting the passage 15, is entered into one end of said sprocket passage and slid along the passage until its inner concave end abuts and conforms to the periphery of the drive shaft 11. The thimble or collar is axially bored, as at 20 to substantially the same diameter as the diametrically extending locking shaft bore 21 in the shaft 11 and the outer end of the thimble may, if desired, be counter-bored to form an annular shoulder 18. When the larger sprocket passage 15 is aligned with the locking shaft bore 21 in the drive shaft, the bore 20 of the thimble 19 lies in alignment with the bore 21 extending through the drive shaft. A headed screw 10 is then entered in that end of the sprocket passage 15 containing the thimble or collar 19, the screw passing through the bore 20 of the thimble 19 until the head 16 of the screw seats in the counter-bored outer end of the thimble against the shoulder 18. The screw is of a length sufficient to pass through the transverse locking bore 21 in the shaft, with its threaded end 24 projecting into the opposite aligned section of the sprocket passage 15. The diameter of the screw 10 is such as to slidingly fit the bore 20 of the thimble 19 and the bore 21 drilled transversely of the shaft 11. Preferably, a tapered or a frusto-conical threaded nut 22 is employed to engage the screw 10. This nut is formed with a concave contact face, as shown in section in Fig. 3, to fit the periphery of the shaft to avoid flattening the shaft. The diameter of the inner end of the nut substantially fits that section of the sprocket passage 15 into which the threaded end 24 of the headed screw 10 projects. Kerfs 17 and 23, formed in the head 16 of the screw and in the outer smaller end of the frusto-conical nut 22 respectively, facilitate turning the nut down on the threaded end of the screw with the nut preferably being held against rotation until the larger end or concave base of the nut is drawn into contact with the arcuate or rounded periphery of the shaft. The collar 19 may be likewise formed with a concave inner end to fit the shaft in correspondence with the inner end of the frusto-conical nut 22.

The collar or thimble 19 prevents the shaft 11 from being marred when the screw 10 is tightened. If no collar were present, the inner face of the screw head 16, when it contacted the shaft and was thereafter turned to tighten its holding effect, would dent the polished periphery of the shaft, and set up a bur preventing the ready removal of the sprocket from the shaft when desired. The provision of the collar eliminates this possibility. Since the tapered nut 22 is not seated in a collar, it is desirable that the key be tightened by turning the screw instead of the nut, the kerf 23 in the nut enabling the insertion of a tool therein to hold the nut stationary as the screw is turned down.

It will be noted that the screw 10 is of less length than the length of the sprocket passage 15 to avoid the possibility of interference with the film extending between the sprocket-toothed rims at the opposite ends of the sprocket. Further, the headed screw 10 with its thimble 19 and nut 22 constitute a key to transmit the rotation of the drive shaft 11 to the sprocket 13, thus leaving the sprocket free and in proper alignment and balance relative to the shaft. The screw 10 with its thimble or collar 19 and nut 22 prevents endwise or axial movement of the sprocket on the shaft as the collar fits snugly in the passage 15 to hold the sprocket where adjusted on the shaft. The screw with its attached parts constitutes a substantially integral, though removable, part of the shaft and contact of the collar and the nut against diametrically opposed surfaces of the shaft equalizes the pressure on both sides of the shaft to thus avoid any bending of the shaft.

The form shown in Fig. 2 is substantially like that shown in Fig. 1, but, in addition, shows a circular cupped spring-washer 25 interposed between the inner end of the thimble 19' and the periphery of the drive shaft 11. The purpose of the washer is to take up axial play of the sprocket 13 with regard to its shaft. The screw 10 passes through a hole centrally of the cupped spring-washer so that when the nut 22 is drawn snugly against the shaft, the cupped spring is slightly flattened by contact with the inner face of the thimble 19' to spread its circumferential edge to engage the periphery of the bore 15 and take up all play between the washer and the bore 15. The flattening or spreading of the cupped washer causes its central aperture to grip the threaded shank of the screw 10 to take up any clearance there present, and it will be noted that there is no unbalanced radial pressure brought to bear on the shaft such as would tend to bend the shaft. The spring-washer also tends to conform to the curvature of the shaft.

Changes and alterations may be made in the forms and arrangements of the several parts described without departing from the spirit and scope of the invention.

What is claimed is:

1. The combination with a rotary shaft, and an element having an axial bore to accommodate the shaft for rotation thereby; of means to key said element to the shaft in such manner as to relieve the shaft of unbalanced radial stress and retain the element on the shaft, comprising a headed and threaded fastening means; said element having an unthreaded passage of substantially uniform diameter formed diametrically therethrough to intersect the axial bore; said shaft having a hole diametrically therethrough of less diameter than the passage and with which the passage through the element is aligned, a portion of the fastening means extending within the unthreaded passage in said element and the aligned hole through the shaft; and a retaining device engaged by the threaded end of the fastening means; the head of the fastening means and the retaining device lying in the opposite ends of the passage, respectively, and effective to clamp the shaft between them at diametrically opposite points, and to serve as a key to transmit rotary motion from the shaft to the element.

2. The combination with a rotary shaft, and an element having an axial bore to accommodate the shaft for rotation thereby; of means to key the element to the shaft, comprising a headed fastening means; said element having an unthreaded passage formed diametrically therethrough and intersecting the axial bore; said shaft having a hole of less diameter than the passage and extending diametrically through the shaft and with which the passage is aligned, the fastening means lying in the unthreaded passage in said element and in the hole through the shaft; a tubular, non-rotatable member in one end of the passage, said member seating on the periphery of the shaft surrounding the diametrically extending hole in the shaft, and through which member a portion of the fastening means extends, the head of the fastening means being engageable with the outer end of the non-rotatable member, and a retaining device for the fastening means in the opposite end of the passage, and engageable by the fastening means to clamp the shaft between the non-rotatable member and the retaining device.

3. In a device for keying together a rotary shaft and an element to be rotated thereby, said element having an axial bore to accommodate the shaft; of a keying device comprising a headed fastening means; said shaft having a hole formed diametrically therethrough; said element having an unthreaded passage extending diametrically therethrough and intersecting the bore of said element, said passage being of larger diameter than the hole through the shaft with which it is aligned; the shank of the headed fastening means being threaded and of a length capable of passing through the hole in the shaft, with its head in one section of the passage and its threaded end in the opposite section of the passage; a retaining means seated in said opposite section of the passage and engageable by the threaded end of the fastening means, and a cupped spring washer interposed between the head of the fastening means and the shaft, said washer having a central aperture through which the shank of the fastening means passes, and expansible as the fastening means tightens on the shaft, to take up the clearance between the fastening means and the wall of the passage.

4. The combination with a rotary shaft, and an element having an axial bore to accommodate the shaft for rotation thereby; of means to key the element to the shaft, comprising a headed fastening means, having a threaded shank; said element having a passage extending therethrough intersecting the axial bore; said shaft having a hole therethrough of less diameter than the passage and aligned with the passage, the headed fastening means fitting the hole in the shaft with its head projecting into one section of the passage and its threaded end projecting into the opposite section of the passage; a retaining means in said last-named section cooperable with and engaged by the threaded end of the fastening means to be drawn against the surface of the shaft; a centrally apertured spacing means interposed between the head of the fastening means and the shaft; and a resilient member located in one of the sections of the passage and expansible as the fastening means tightens, to take up clearance between the fastening means and the wall of the passage.

5. In a device to key a sprocket to a rotary shaft, the sprocket having a bore to accommodate the shaft; the combination of a headed screw; the shaft having a hole extending diametrically thereof; the sprocket having a diametrically extending unthreaded passage intersecting the bore of the sprocket, and of larger diameter than the hole through the shaft with which hole the passage is aligned; the screw being insertable through one end of the passage into the hole of the shaft, with the threaded end of the shank of the screw projecting into the opposite end of the passage, a retaining means fitting in said opposite end of the passage for engagement by the threaded end of the screw; and a spacing collar fitting the passage and having an aperture of similar diameter to that of the transverse hole through the shaft, and aligned therewith, the screw passing through the collar aperture with its head in contact with the outer end of the collar.

6. In a device to key a sprocket to a rotary shaft, the sprocket having a bore to accommodate the shaft; the combination of a headed screw; the shaft having a hole extending diametrically thereof, the sprocket having a diametrically extending unthreaded passage intersecting the bore of the sprocket, and of larger diameter than the hole through the shaft with which the passage is aligned; a collar substantially fitting the passage and having an aperture therethrough of a diameter approximately of the diameter of the transverse hole through the shaft; the screw insertible in one end of the passage and through the central aperture in the collar so that, when so inserted the threaded end of the shank of the screw projects into the opposite end of the passage, the head of the screw resting on the collar; a retaining means insertible in and substantially fitting said opposite end of the passage for engagement by the threaded end of the screw to draw the retaining means toward the shaft at a point diametrically opposite the head of the screw; and an expansible means seated in the passage and having a central aperture through which the shank of the screw passes, said expansible means being compressible by the screw to take up the clearance between the screw and the wall of the passage.

7. A keying device to transmit rotary motion from a shaft to a sprocket and to retain the sprocket on the shaft, comprising a shaft having a hole formed transversely therethrough; a sprocket having a bore extending along its axis of rotation to slidingly accommodate the shaft, and having a passage extending transversely through the sprocket of greater diameter than the diameter of the transverse hole through the shaft with which it is aligned; a screw passing through the transverse hole in the shaft, the head of the screw extending into one section of the passage on one side of the shaft, the threaded end of the screw extending into that section of the passage on the opposite side of the shaft; a threaded retaining means slidingly fitted into the last-named section of the passage for engagement by the threaded end of the screw; and expansion means in the passage and through which means the screw passes, for expansion as the screw is tightened, to take up clearance between the screw and the wall of the passage.

8. The combination of a rotary shaft having a bore formed transversely therethrough; a film sprocket having an axial bore in which the shaft fits, said sprocket having a locking passage formed therethrough normal to said axial bore, said passage being of substantially greater diameter than, and alignable with, said transverse bore through the rotary shaft; a thimble disposed snugly within one end of said locking passage and having a concave surface fitting congruently with a portion of said shaft adjacent said passage; locking means engaging said shaft snugly within said passage at the end thereof opposite to that engaged by said thimble; and a threaded element entered in the locking passage and the axial bore; said threaded element passing slidably through the thimble and threadably engaging through the locking means for drawing said locking means and thimble tightly into contact with said shaft.

HENRY F. HEIDEGGER.
WILLY BORBERG.

REFERENCES CITED

The following references are of record in the file of this patent:

UNITED STATES PATENTS

| Number | Name | Date |
| --- | --- | --- |
| 531,334 | Ross | Dec. 25, 1894 |
| 781,043 | Woodrum | Jan. 31, 1905 |
| 1,921,866 | Dina | Aug. 8, 1933 |